(12) United States Patent
Becke et al.

(10) Patent No.: US 12,150,228 B2
(45) Date of Patent: Nov. 19, 2024

(54) PEF COOKING APPLIANCE AND PEF SYSTEM

(71) Applicant: BSH Hausgeräte GmbH, Munich (DE)

(72) Inventors: Christoph Becke, Grosskarolinenfeld (DE); Christian Hafer, Erding (DE); Uwe Has, Unterneukirchen (DE); Barbara Heikel, Traunstein (DE); Arnulf Himmel, Traunreut (DE); Bernhard Koch, Inzell (DE); Florian Michl, Trostberg (DE); Manfred Steinbacher, Inzell (DE); Edith Wrehde, Nußdorf (DE); Felicitas Ziegler, Stein a.d. Traun (DE)

(73) Assignee: BSH Hausgeräte GmbH, Munich (DE)

( * ) Notice: Subject to any disclaimer, the term of this patent is extended or adjusted under 35 U.S.C. 154(b) by 821 days.

(21) Appl. No.: 17/298,959

(22) PCT Filed: Dec. 13, 2019

(86) PCT No.: PCT/EP2019/085202
§ 371 (c)(1),
(2) Date: Jun. 2, 2021

(87) PCT Pub. No.: WO2020/120784
PCT Pub. Date: Jun. 18, 2020

(65) Prior Publication Data
US 2022/0053614 A1 Feb. 17, 2022

(30) Foreign Application Priority Data
Dec. 14, 2018 (DE) ..................... 10 2018 221 814.5

(51) Int. Cl.
*H05B 6/62* (2006.01)
*A47J 27/00* (2006.01)
(Continued)

(52) U.S. Cl.
CPC .............. *H05B 6/62* (2013.01); *A47J 27/004* (2013.01); *F24C 15/166* (2013.01); *H05B 6/54* (2013.01)

(58) Field of Classification Search
CPC ......... A23L 5/15; A47J 27/004; F24C 15/166; H05B 6/54; H05B 6/62; Y02P 20/52
(Continued)

(56) References Cited

U.S. PATENT DOCUMENTS 3,143,638 A * 8/1964 Scott ..................... F24C 7/06
312/330.1
4,333,521 A 6/1982 Smith
(Continued)

FOREIGN PATENT DOCUMENTS

DE 102010028780 A1 11/2011
DE 112014001599 T5 6/2016
(Continued)

OTHER PUBLICATIONS

International Search Report PCT/EP2019/085202 dated Mar. 13, 2020.

*Primary Examiner* — Quang T Van
(74) *Attorney, Agent, or Firm* — Michael E. Tschupp; Andre Pallapies; Brandon G. Braun

(57) ABSTRACT

A PEF cooking appliance includes a PEF generator, and a carrier configured to receive a storage container for food. The carrier includes at least two PEF electrodes spaced apart to enable insertion of the storage container there between. At least one the PEF electrodes is connected to the PEF generator. The carrier is embodied as a drawer with a top cover pivotably attached thereto The drawer includes a base, with one of the two PEF electrodes being integrated into the base of the drawer and another one of the two PEF electrodes being integrated into the cover of the drawer.

20 Claims, 3 Drawing Sheets

(51) Int. Cl.
*F24C 15/16* (2006.01)
*H05B 6/54* (2006.01)

(58) Field of Classification Search
USPC ....... 219/771, 770, 764, 776, 778, 780, 383,
219/384, 520; 426/107, 112
See application file for complete search history.

(56) References Cited

U.S. PATENT DOCUMENTS

| | | |
|---|---|---|
| 2014/0057025 A1 | 2/2014 | Van Oord |
| 2016/0150905 A1 | 6/2016 | Van Oord |
| 2016/0205972 A1 | 7/2016 | Roelofs |

FOREIGN PATENT DOCUMENTS

| | | | |
|---|---|---|---|
| JP | 2010175178 A | * | 8/2010 |
| WO | 2011139144 A1 | | 11/2011 |

* cited by examiner

PEF COOKING APPLIANCE AND PEF SYSTEM

CROSS-REFERENCES TO RELATED APPLICATIONS

This application is the U.S. National Stage of International Application No. PCT/EP2019/085202, filed Dec. 13, 2019, which designated the United States and has been published as International Publication No. WO 2020/120784 A1 and which claims the priority of German Patent Application, Serial No. 10 2018 221 814.5, filed Dec. 14, 2018, pursuant to 35 U.S.C. 119(a)-(d).

BACKGROUND OF THE INVENTION

The invention relates to a PEF cooking appliance, having a PEF generator and at least one carrier for receiving at least one storage container for food. The invention also relates to a PEF system with a PEF cooking appliance and at least one storage container inserted removably therein. The invention can be applied particularly advantageously to household appliances for treating food.

One method previously applied commercially in the food industry for supplying energy into food is based on the generation of pulsed electrical fields (PEF) at the site of the food. In this regard foods are exposed to alternating electrical fields with a pulse duration of e.g. up to several tens of microseconds. These alternating fields bring about alternating current pulses which flow through the food and which introduce an ohmic power loss into the food and as a result bring about an ohmic heating of the food. Capacitive shifting currents, which may assume very large values, are also generated in the food. These shifting currents bring about a certain disinfection of the food and emulate the process of pasteurization in terms of their effect on food.

With non-liquid or lumpy foods, the intermediate spaces between them are filled with water. So much salt is added to the water in this process that the electrical conductivity of the water at least approximately corresponds to the electrical conductivity of the food.

WO 2011/139144 A1 discloses a method and a system for treating an essentially solid foodstuff product, with which a cell disruption of the foodstuff product occurs and the requisite increase in temperature required for the processing of macronutrients is established. The system comprises means which are arranged in order to subject the food product to a pulsed electrical field for destroying the cells of the food product and for processing the macronutrients, as a result of which it is prepared for the intended consumption and efficient digestion.

DE 10 2010 028 780 A1 provides a device and a method for heating food in batches, in particular meats and sausages, which can optionally be arranged in an electroconductive jacket, in a chamber, which has two electrodes which are spaced apart and to which electrical voltage can be applied, wherein the electrical voltage is alternating voltage with a frequency of 500 Hz to 10 MHz or pulse voltage comprising bipolar, DC-free pulses with pulse widths or pulse durations of 50 ns to 1 ms.

BRIEF SUMMARY OF THE INVENTION

It is the object of the present invention to overcome at least partially the disadvantages of the prior art and, in particular, to provide a possibility of heating food by means of PEF fields, which is particularly user-friendly and cost-effective.

This object is achieved according to the features of the independent claims. Advantageous embodiments are the subject matter of the dependent claims, the description and the drawings.

The object is achieved by a PEF cooking appliance, having a PEF generator and at least one carrier for receiving at least one storage container for food, wherein the carrier has at least two electrodes, between which at least one storage container can be inserted and of which at least one electrode ("PEF electrode") is connected to the PEF generator, wherein the relevant carrier is embodied as a drawer which can be pulled out in particular horizontally and has a cover pivotably attached to the top and wherein at least one electrode is integrated into the base and the cover of the drawer in each case or is arranged there.

As a result, the advantage is achieved in that horizontally particularly large-area storage containers can be inserted easily into the drawer. This in turn increases accessibility to the food located in the storage containers. Moreover, such storage containers can be cleaned particularly easily. Furthermore, such an arrangement can be implemented particularly cost-effectively. Furthermore, it is advantageous that a space for food to be treated by PEF can be utilized very effectively.

Here the term food can include all types of animal or plant food, for instance all types of fruit, vegetables, meat, fish or poultry, irrespective of whether this food is raw or preprocessed at the start of the preparation. Further food, such as scrambled eggs, cereals, rice, noodles etc. can likewise be prepared.

The PEF generator generates pulsed electrical signals ("PEF signals") which can be applied to at least one PEF electrode of a drawer. If the PEF generator has a number of signal outputs, in one development these can be controlled individually. A signal output can be connected to one or more PEF electrodes.

The PEF electrodes are in particular electrodes to which a pulsed electrical signal generated by the PEF generator can be applied. A PEF electrode forms with the electrode (PEF electrode or grounded electrode) facing it in particular plates of a capacitor, between which the PEF field is generated and between which the food is positioned.

Basically a drawer can have one or more receptacles or receiving areas for receiving one or more receiving containers in each case. Accordingly each receptacle can be assigned at least two electrodes, of which at least one electrode is a PEF electrode which can be connected to a signal output of the PEF generator.

In one embodiment the at least one PEF electrode is integrated into the cover. The at least one electrode integrated into the base of the drawer is then not connected to the PEF generator, but is instead e.g. grounded. By comparison with a, fundamentally likewise possible, arrangement of at least one PEF electrode in the cover and at least one PEF electrode in the base of the drawer, it is advantageous that particularly high operational reliability and user safety is achieved and moreover a particularly cost-effective structure of the PEF generator and the drawer is enabled. Compared with a, fundamentally likewise possible, grounded electrode in the cover and PEF electrode in the base, a grounding which is particularly reliable and can be implemented in a structurally simple manner is produced.

In one embodiment, at least one PEF electrode projects from an interior of the cover (which points in particular downward or in the direction of the interior space of the drawer when the cover is closed). This is advantageous in that it can be reliably achieved that the PEF electrode can come into contact with the food located in the receiving container, since the PEF electrode can be immersed particularly easily into a receiving container which is open at the top. The electrode is in particular plate-shaped. The projecting PEF electrode is arranged in particular so that when the cover is closed it is immersed into a spatial area of the carrier which is provided for a respective storage container. It is advantageously so big that it can be immersed into the receiving container over a large area and can in particular practically completely cover it. In one development, the projecting PEF electrode has holes in order to allow gases forming on the food to pass through.

In one embodiment, the at least one projecting PEF electrode is suspended resiliently, so that advantageously a certain pressure on the food can be ensured and a particularly reliable closing of the cover is achieved.

In one development, the cover-side PEF electrode is embodied in two layers with an (in the closed state of the cover) upper electrode and a lower electrode distanced therefrom, wherein the upper electrode is provided as a test contact for identifying its contact with water or food. If the upper or higher electrode identifies contact with the water or food, then the lower PEF electrode is immersed properly. This in turn increases operational reliability and improves a preparation result. The upper electrode can be a pure test electrode or also a PEF electrode.

In one embodiment, each drawer is equipped with a respective PEF generator, which is located in particular in a rear section of the drawer, in the pull-out direction of the drawer, while the at least one storage container can be inserted into a front section of the drawer and in particular only the front section can be covered by means of the associated cover. The advantage is therefore achieved that a particularly safe and reliable electrical connection can be provided between the PEF generator and the at least one PEF electrode of a drawer. The carrier for the at least one receiving container is therefore positioned or formed by the front section. The rear section is advantageously not accessible for a user and can in particular be permanently housed, e.g. also by means of a shielding.

In one embodiment, the drawer has a plug connection element of at least one respective detachable electrical plug connection on the rear side and the plug connection, in the connected state, establishes an electrical connection between the PEF generator and a power supply. The advantage of an exceptionally fail-safe arrangement is therefore achieved: the PEF generator can then only be energized if the drawer is slid in completely or almost completely in a housing of the PEF cooking appliance and thus the drawer (except for an in particular PET-neutral or even shielding front plate) is not accessible for a user. With this embodiment, upon insertion of the drawer, a plug connection element of the drawer is therefore immersed into a suitable plug connection counter element, which can be located on the housing of the PEF device, for instance, e.g. integrated into a rear wall or intermediate wall. As a result, the PEF generator can be supplied with electrical current. If the drawer is pulled out, the plug connection element leaves the plug connection counter element and a power supply to the PEF generator is interrupted.

In an alternative embodiment, on the rear side the drawer has a plug connection element of at least one respective detachable electrical plug connection and, in the connected state, the plug connection establishes an electrical connection between a housing-side PEF generator and the at least one cover-side PEF electrode. Here the PEF generator is therefore not integrated into the drawer, but instead into the housing of the PEF device. This is advantageous in that the drawer can be configured particularly easily. With this embodiment, upon insertion of the drawer, the plug connection element is immersed into a suitable plug connection counter element which is connected to the PEF generator. As a result, the PEF generator is separated from the at least one PEF electrode. If the drawer is pulled out, the plug connection element leaves the plug connection counter element and a signal connection with the PEF generator is interrupted.

By comparison with a power supply by way of flexible electrical lines, the use of a plug connection has the further advantage that a risk of breakage of the lines is avoided.

In one embodiment, the cover is designed and arranged on the drawer so that it can then only noticeably open when the drawer is practically fully extended. As a result, particularly high operational reliability is advantageously achieved. This embodiment can be implemented, for instance, in that the housing has a front opening ("insertion opening") for inserting or sliding in the drawer and an upper edge of the insertion opening has an only minimal vertical distance from the closed cover. An axis of rotation of the cover can then be positioned in front of the insertion opening only when the drawer is in the fully extended state.

In one development, the PEF cooking appliance has an insertion opening on its housing receiving the drawer, and on the upper edge this insertion opening has at least one local stop in relation to the cover. This enables a particularly simple implementation of the stop, which can then be formed by the upper edge of the insertion opening. When the drawer is completely inserted, the through opening is closed or covered in particular by a front plate of the drawer.

In one embodiment, the drawer has a monitoring sensor for monitoring a closing state of the cover. This can further increase operational reliability. The associated PEF generator can then be deactivated if an opened state of the cover is identified by means of the monitoring sensor. In one development, the monitoring sensor comprises at least one switch, in particular contact switch to the cover. This is a particularly reliable, compact and cost-effective implementation.

In one development, at least one current sensor is present in the signal path between the PEF generator and the at least one PEF electrode. The current sensor can be connected to an evaluation facility, which is also connected to an electrically switchable switch, which is present in the signal path between the PEF generator and the at least one PEF electrode, in particular in series with the at least one current sensor. In this way, currents to the PEF electrode can advantageously be evaluated and possibly interrupted.

In one development, a current limiter is arranged in the signal path between the PEF generator and the at least one PEF electrode. This avoids overcurrents in the PEF electrode particularly reliably and increases operational reliability.

In one embodiment, the base-side, in particular grounded, electrode forms a contact area for the at least one storage container. The base-side electrode can be brought particularly close to the at least one storage container, which enables particularly effective PEF treatment of the food located in the at least one storage container. The electrode then forms in particular a top side of the base.

In one embodiment, the drawer is connected to a grounded housing of the PEF cooking appliance by way of an electrically conductive pull-out system and the base-side electrode is connected to the housing by way of the pull-out system. This enables a particularly compact and reliable arrangement for grounding the base-side electrode. The pull-out system can have a number of telescopic slide-outs or expansion joints, for instance, of which at least one is electrically conductive.

In one embodiment, the drawer comprises at least one sensor for sensing at least one property of the food. As a result, a monitoring of the food which improves the certainty of success is advantageously made possible.

The at least one sensor can comprise e.g. at least one temperature sensor for sensing a temperature of the food. To this end, the temperature can be detected directly or indirectly by way of detecting the temperature of the receiving container.

A temperature sensor can be a contact sensor, e.g. a thermo element, or a contactless measuring sensor, e.g. an IR diode, a thermopile etc.

The at least one sensor can alternatively or in addition comprise at least one conductivity sensor for measuring the electrical conductivity of the food or the liquid in the receiving container.

In one embodiment, the drawer comprises at least one sensor for sensing fields, voltages and/or currents in the food produced during PEF treatment. As a result, operational reliability and/or certainty of success is improved. This can comprise a sensing of a shape of the voltage pulses and/or the current pulses. A shape can be understood to mean for instance a height of the pulse, a gradient of the rising and/or falling edges of the pulses and/or a duration of the pulses.

A drawer can also have at least one actuator for the non-electrical treatment of the food. The certainty of success can therefore be further improved. In one development, the at least one actuator comprises a stirrer, by means of which the contents of the receiving container can be set in motion. A formation of gas bubbles in the receiving container can advantageously be avoided and/or a temperature in the food can be equalized. The stirrer can be for instance a mechanically driven, e.g. circulating, stirrer, a vibrating stirrer or an ultrasound stirrer.

In one embodiment, the PEF cooking appliance is a household appliance.

This object is also achieved by a PEF system, having a PEF cooking appliance as described above and at least one storage container inserted removably into a drawer. The PEF system can be embodied similarly to the PEF cooking appliance and has the same advantages.

In one embodiment, the storage containers are tray-like storage containers, which are open in particular on the top side in order to facilitate immersion of the PEF electrode(s), for instance. One or more storage containers can be accommodated in a drawer, which depends e.g. on a size of the storage container or storage containers. The storage containers may be present in various sizes in particular in a top view.

The at least one storage container can have a height which is smaller than a horizontal extent, e.g. edge length.

A storage container can have in particular an electrically conductive base, so that this base can contact a base-side electrode of the drawer. The base of the storage container can then itself be used as a PEF electrode, which increases the effectiveness of the food treatment. In particular, the base of the storage container, and possibly the base-side electrode of the drawer which is exposed on the top side, can consist of stainless steel, which enables a particularly low-maintenance and durable structure. The side walls of the storage container and possibly of the drawer advantageously consist of an electrically insulating material, e.g. of electrically insulating plastic. Alternatively, a storage container can consist completely of material which is permeable to electrical fields, e.g. plastic.

In the case that the PEF electrodes assigned to different storage containers can be controlled or operated individually, it is advantageous that different treatment cycles or regimes (e.g. comprising different operating settings, durations etc.) can be navigated in the individual storage containers. A simultaneous preparation of very different food is thus also possible. This in turn facilitates or improves a user friendliness of the appliance.

The PEF cooking appliance can have one or more PEF modules, which have respective housing and drawers as described above. To this end, the PEF cooking appliance can have a receiving frame for at least two PEF modules which can be arranged one above the other, for instance. The frame can be or is grounded in particular, so that the housing of the PEF modules can be grounded by an electrical connection of the frame with PEF modules inserted therein.

BRIEF DESCRIPTION OF THE DRAWINGS

The above-described properties, features and advantages of this invention and the manner in which these are achieved will become clearer and more readily understandable in connection with the following schematic description of an exemplary embodiment, which will be described in further detail making reference to the drawings.

DETAILED DESCRIPTION OF EXEMPLARY EMBODIMENTS OF THE PRESENT INVENTION

Figure 1:
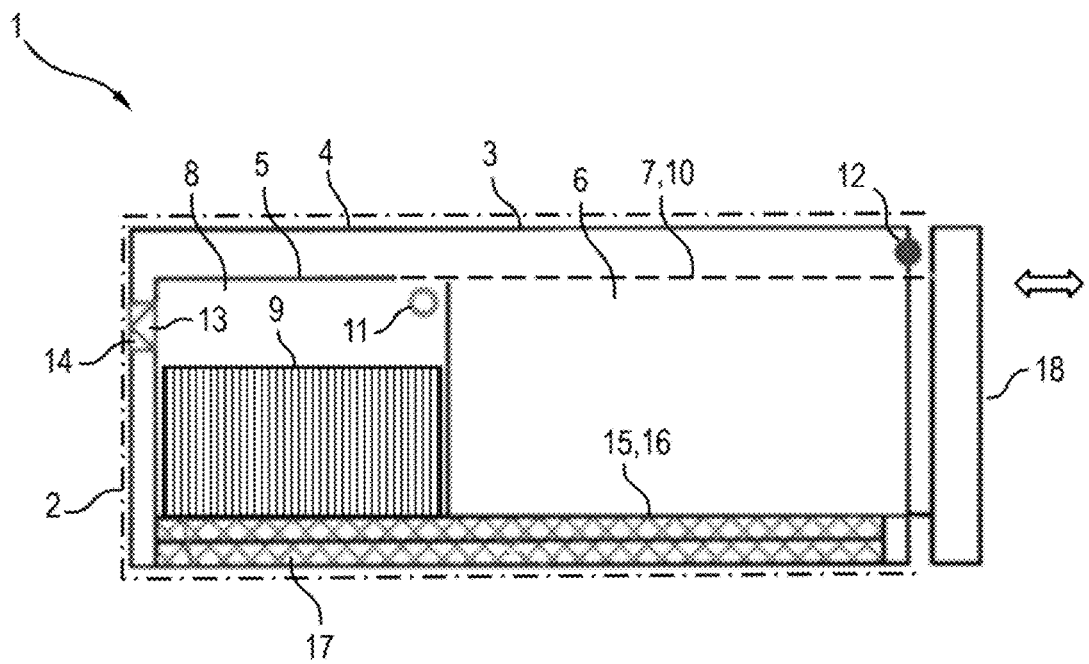
FIG. 1 shows, as a sectional representation in the side view, an outline of a PEF appliance with a PEF module inserted therein with a fully inserted drawer.

FIG. 1 shows, as a sectional representation in the side view, an outline of a PEF cooking appliance 1 provided as a household appliance. The PEF cooking appliance 1 has a frame 2, into which a PEF module 3 is inserted. The frame 2 is grounded.

The PEF module 3 has a housing 4 with a front-side insertion opening, in which a drawer 5 is supported so that it can move horizontally, as indicated by the double arrow. The drawer 5 has two sections or "compartments", namely one front section 6, in the pull-out direction, for receiving the receiving containers A (see FIG. 4 and FIG. 5), which is covered by a horizontally pivotable cover 7, and one rear section 8, in the pull-out direction, in which a PEF generator 9 is accommodated. The front section 6 therefore serves as a carrier for at least one receiving container A. The rear section 8 is closed so that the PEF generator 9 is not accessible for a user.

A PEF electrode 10 is integrated into the cover 7 over a large area or the cover also serves as a PEF electrode. The PEF electrode 10 is connected to a signal output of the PEF generator 9 by way of a contact switch 11. With a closed cover 7, the contact switch 11 is switched in a conducting manner so that pulsed electrical signals output from the signal output of the PEF generator 9 are applied to the PEF electrode 10. With an open cover 7, the contact switch 11 is by contrast switched with interruptions.

The top side of the insertion opening forms a stop 12 in relation to the cover 7 or has one such stop 12, so that the cover 7 can only open when the drawer 5 is pulled out practically completely.

When the drawer 5 is in the inserted state, a plug connection element 13 arranged on a rear wall of the drawer 5 is immersed into a plug connection counter element 14 of the frame 2 and then forms an electrically conducting plug connection 13, 14. The plug connection element 13 is connected to the PEF generator 9, while the plug connection counter element 14 is connected to a power supply (see FIG. 6) arranged e.g. on the frame 2. In the connected state of the plug connection 13, 14, the PEF generator can therefore be supplied with current. PEF signals can only then be applied to the PEF electrode 10 if the cover 7 is closed and the drawer 5 is slid completely into the housing 4.

A base 15 of the drawer 5 is embodied as a metallic electrode 16 at least at the top, in particular over the entire surface. The electrode 16 is connected electrically with a pull-out system 17, which connects the drawer 5 displaceably with the housing 4, and is thus electrically connected with the housing 4. Since the housing 4 is grounded e.g. by way of the frame 2, the electrode 16 is also grounded by way of the pull-out system 17. Since the grounded electrode 16 extends as far as the rear section 8 and is connected there with the PEF generator 9, it can also be used to ground the PEF generator 9.

The front section 6 of the drawer 5 therefore has two electrodes 10, 16, between which at least one storage container can be inserted.

On the front side the drawer 5 has a front plate 18 which can be handled by a user, e.g. in order to pull out and slide in the drawer 5.

Figure 2:
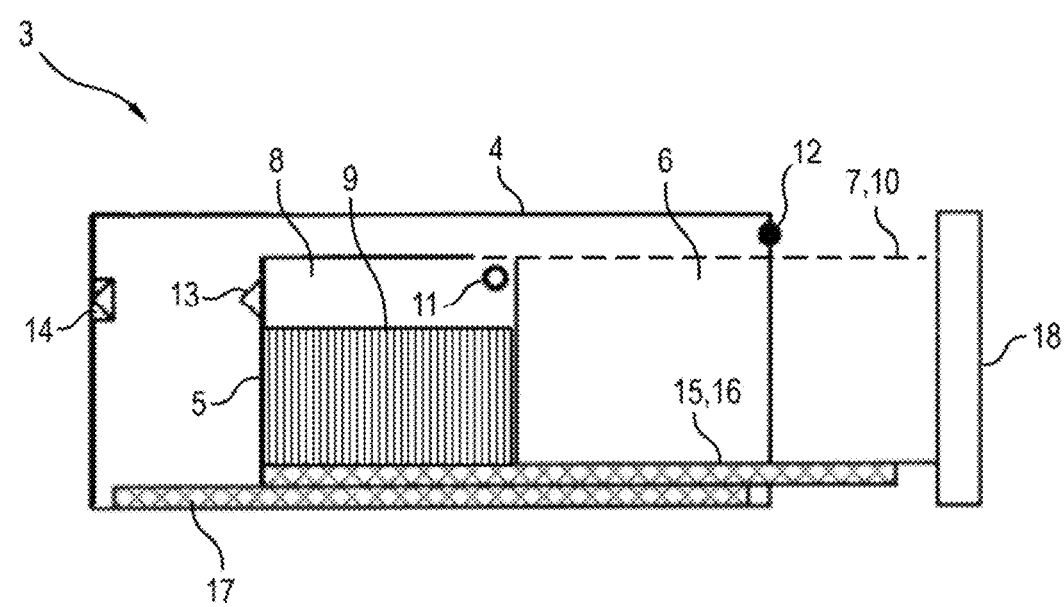
FIG. 2 shows, as a sectional representation in the side view, an outline of the PEF module from FIG. 1 with a partially pulled-out drawer.

FIG. 2 shows, as a sectional representation in the side view, an outline of the PEF module 3 with a partially pulled-out drawer. The pulling out process now separates the plug connection element 13 from the plug connection counter element 14 so that the power supply to the PEF generator 9 is interrupted. On account of the stop 12, the cover 7 is still not able to open.

Figure 3:
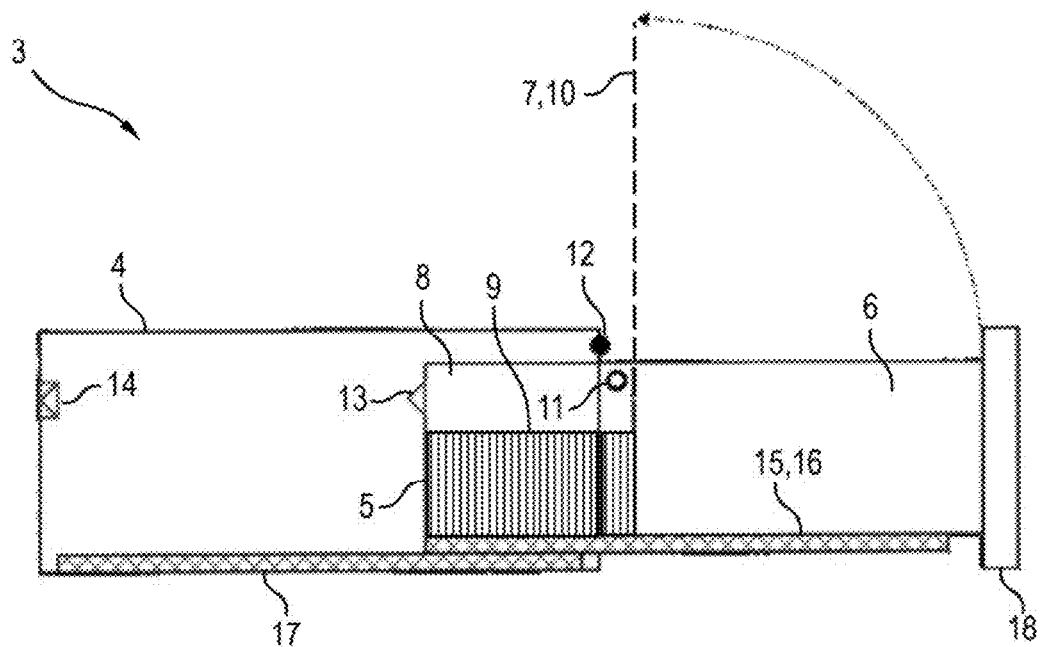
FIG. 3 shows, as a sectional representation in the side view, an outline of the PEF module from FIG. 1 and FIG. 2 with a completely pulled-out drawer.

FIG. 3 shows, as a sectional representation in the side view, an outline of the PEF module 3 with a completely pulled-out drawer 5 and opened cover 7. Since the pivot axis of the cover 7 is now located in front of the stop 12, the cover 7 can be opened, as a result of which the front section 6 is accessible for a user, e.g. an insertion or removal of receiving containers A. With an open cover 7, the contact switch 11 is opened, so that an electrical connection between the PEF generator 9 and the PEF electrode 10 of the cover 7 is also interrupted. The rear section 8 is furthermore not accessible for a user.

Figure 4:
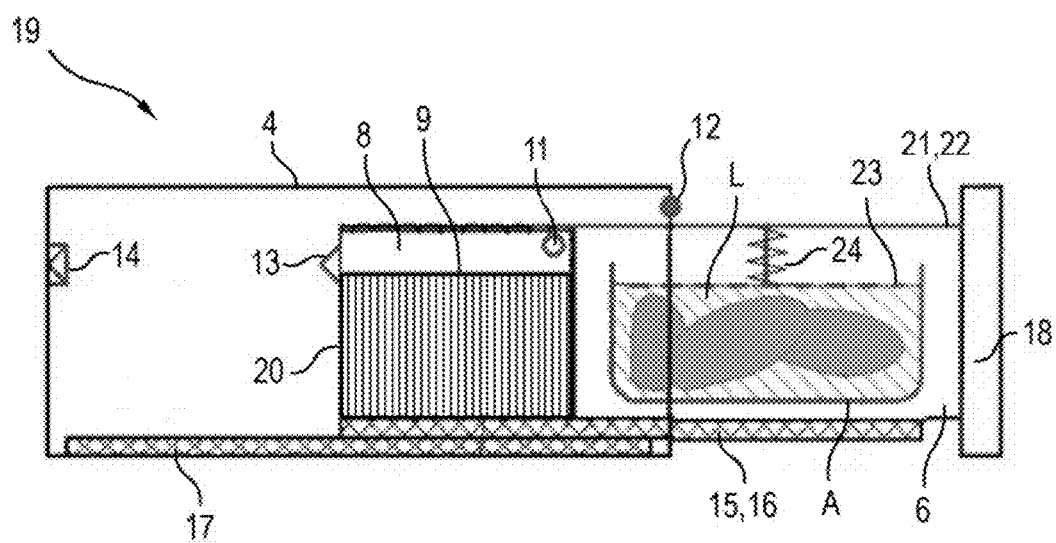
FIG. 4 shows, as a sectional representation in the side view, an outline of an alternative PEF module with a partially pulled-out drawer.

FIG. 4 shows, as a sectional representation in the side view, an outline of an alternative PEF module 19 with a partially pulled-out drawer 20. The PEF module 19 is embodied similarly to the PEF module 3, wherein the cover 21 is now embodied differently, however. In particular, the cover 21 has just one mechanically acting cover part 22, from the interior of which a plate-shaped PEF electrode 23 projects beyond a spring element 24. The PEF electrode 23 can be immersed into an open top side of a tray-type receiving container A and contact the food L located therein or the liquid containing salt surrounding the food. Here the PEF electrode 23 is formed in particular so that it practically completely covers the receiving container A. A particularly effective PEF treatment of the food L is therefore achieved.

The spring element 24 enables the position of the PEF electrode 23 to be adjusted to the food L and enables a reliable closure of the cover 21.

In one development, the PEF electrode 23 has holes, so that a possible gas formation through the food L does not result in a (partial) contact loss between the PEF electrode 23 and the contents of the receiving container A.

Alternatively, a PEF electrode can also be integrated into the cover part 22.

The receiving container A can have in particular a metallic base, so that it can come into contact over a large area with the electrode 16 and the base of the receiving container A can then itself serve as an electrode.

Figure 5:
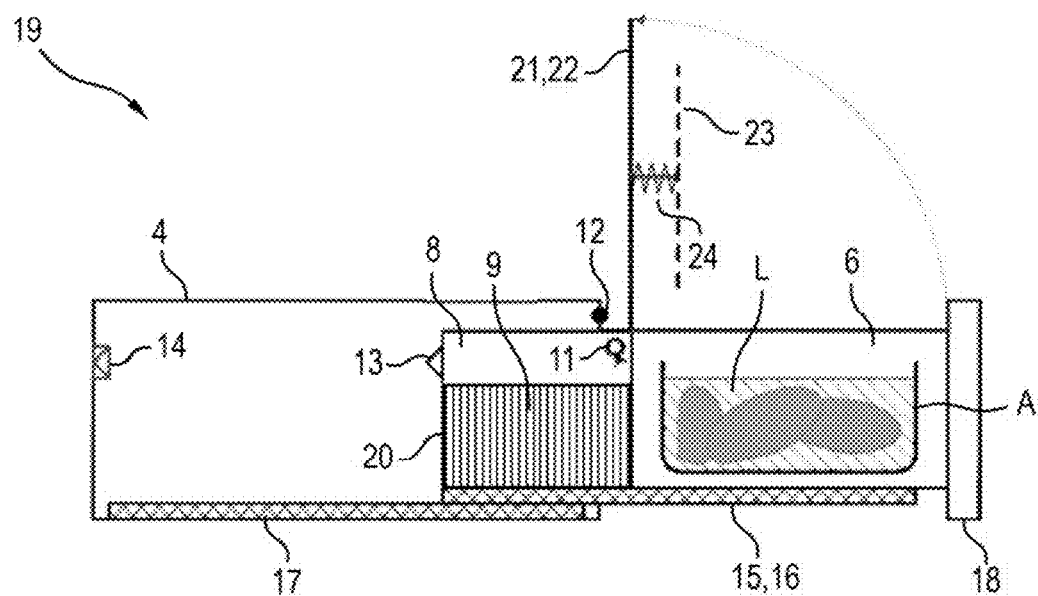
FIG. 5 shows, as a sectional representation in the side view, an outline of the alternative PEF module with a completely pulled-out drawer

FIG. 5 shows, as a sectional representation in the side view, an outline of the alternative PEF module 19 with a completely pulled-out drawer 20 and opened cover 21.

Figure 6:
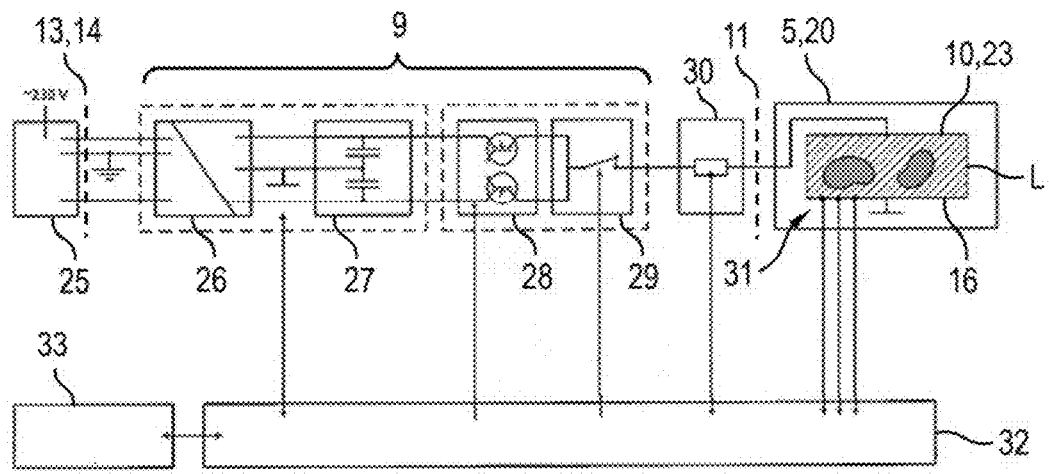
FIG. 6 shows an equivalent circuit diagram of a circuit for PEF treatment of food by means of a PEF generator of the PEF module.

FIG. 6 shows a simplified equivalent circuit diagram of a circuit for PEF treatment of food by means of a PEF generator 9 of the PEF module 3 or 19. The circuit has a power supply unit 25 e.g. on the frame 2, which power supply unit can have an interference filter. The power supply unit 25 is connected to an electrical connection of the PEF generator 9 by way of the plug connection 13, 14. The PEF generator 9 has a voltage generator 26, which is connected on the output side with a capacitor bank 27. The capacitor bank 27 is used to keep the voltage output by the voltage generator 26 stable. The capacitor bank 27 is connected on the output side with a pulse generator 28 for generating strong voltage pulses. The pulse generator 28 is in turn connected on the output side by way of an electrically switchable switch 29, a current sensor and limiter 30 and the switch 11 with the PEF electrode 10, 23 of the drawer 5 or 20. The other electrode 16, which serves as capacitor plates of a capacitor with the PEF electrode 10, 23, between which the food L can be introduced, is grounded or connected with ground.

Here a number of sensors 31 are present on the drawer 5 or 20, by means of which e.g. a temperature and/or an electrical conductivity in the receiving container A, a shape of the voltage pulses and/or current pulses at the site of the food L, etc. can be detected.

The circuit also comprises an electronics unit 32 for controlling the circuit, for instance for evaluating the measuring signals of the current sensor 30, for actuating (e.g. for opening and closing) the switch 29, in particular on the basis of an evaluation of the measuring signals of the current sensor 30, for actuating (e.g. switching on and off, for pulse formation, etc.), and monitoring (e.g. the output voltages) of the PEF generator 9 and possibly for actuating a user interface 33 of the PEF cooking appliance 1.

The present invention is naturally not restricted to the exemplary embodiment shown.

The drawer can therefore generally comprise one or more sensors for sensing at least one property of the food and/or of the fields and/or voltages/currents routed through the food during PEF treatment.

A drawer can also generally have one or more actuators for the non-electrical treatment of the food e.g. a stirrer.

In general, "a", "one" etc. can be regarded as a singular or a plurality, in particular in the sense of "at least one" or "one or more" etc., as long as this is not explicitly excluded, e.g. by the expression "precisely one" etc.

In addition, a given number can include precisely the number given and also a conventional tolerance range, as long as this is not explicitly excluded.

The invention claimed is:

1. A PEF cooking appliance, comprising:
   a PEF generator; and
   a carrier configured to receive a storage container for food, said carrier including at least two PEF electrodes spaced apart to enable insertion of the storage container there between, at least one the PEF electrodes being connected to the PEF generator, said carrier being embodied as a drawer with a top cover pivotably attached thereto, said drawer including a base, with one of the two PEF electrodes being integrated into the base of the drawer and another one of the two PEF electrodes being integrated into the cover of the drawer.

2. The PEF cooking appliance of claim 1, wherein the other one of the two PEF electrodes is the at least one PEF electrode which is connected to the PEF generator.

3. The PEF cooking appliance of claim 1, wherein at least one of the two PEF electrodes projects from an interior of the cover.

4. The PEF cooking appliance of claim 3, wherein the at least one projecting PEF electrode is resiliently suspended.

5. The PEF cooking appliance of claim 1, wherein the drawer is equipped with the PEF generator, which is located in a rear section of the drawer in a pull-out direction of the drawer, said storage container being insertable into a front section of the drawer, with the cover being configured to only cover the front section of the drawer.

6. The PEF cooking appliance of claim 5, further comprising a detachable electrical plug connection including a plug connection element on a rear side of the drawer, said plug connection establishing in a connected state an electrical connection between the PEF generator and a power supply.

7. The PEF cooking appliance of claim 1, further comprising a detachable electrical plug connection including a plug connection element on a rear side of the drawer, said plug connection establishing in a connected state an electrical connection between a housing of the PEF generator and the other one of the two PEF electrodes.

8. The PEF cooking appliance of claim 1, wherein the cover is configured and arranged on the drawer such that the cover is noticeably openable only when the drawer is fully extended, and further comprising a housing configured to receive the drawer and having an insertion opening for passage of the drawer, and a stop provided on an upper edge of the insertion opening in relation to the cover.

9. The PEF cooking appliance of claim 1, wherein the drawer comprises a monitoring sensor for monitoring a closure state of the cover.

10. The PEF cooking appliance of claim 1, further comprising a grounded housing and an electrically conductive pull-out system, wherein the drawer is connected to the housing by way of the electrically conductive pull-out system, said one of the two PEF electrodes being connected to the grounded housing by way of the electrically conductive pull-out system.

11. The PEF cooking appliance of claim 1, wherein the drawer comprises a sensor for sensing a property of the food.

12. The PEF cooking appliance of claim 1, wherein the drawer comprises a sensor for sensing fields, voltages and/or currents in the food generated during a PEF treatment.

13. The PEF cooking appliance of claim 1, wherein the drawer comprises actuator for a non-electrical treatment of food.

14. The PEF cooking appliance of claim 1, constructed in the form of a household appliance.

15. A PEF cooking system, comprising:
    a PEF cooking appliance comprising a PEF generator, and a carrier including at least two PEF electrodes, with at least one the PEF electrodes being connected to the PEF generator, said carrier being embodied as a drawer with a top cover pivotably attached thereto, said drawer including a base, with one of the two PEF electrodes being integrated into the base of the drawer and another one of the two PEF electrodes being integrated into the cover of the drawer; and
    a storage container for food, said storage container inserted into the drawer between the at least two PEF electrodes.

16. The PEF cooking system of claim 15, wherein at least one of the two PEF electrodes projects from an interior of the cover.

17. The PEF cooking system of claim 16, wherein the at least one projecting PEF electrode is resiliently suspended.

18. The PEF cooking system of claim 15, wherein the drawer is equipped with the PEF generator, which is located in a rear section of the drawer in a pull-out direction of the drawer, said storage container being insertable into a front section of the drawer, with the cover being configured to only cover the front section of the drawer.

19. The PEF cooking system of claim 18, further comprising a detachable electrical plug connection including a plug connection element on a rear side of the drawer, said plug connection establishing in a connected state an electrical connection between the PEF generator and a power supply.

20. The PEF cooking system of claim 15, wherein the cover is configured and arranged on the drawer such that the cover is noticeably openable only when the drawer is fully extended, and further comprising a housing configured to receive the drawer and having an insertion opening for passage of the drawer, and a stop provided on an upper edge of the insertion opening in relation to the cover.

* * * * *